(12) United States Patent
O'Gwynn

(10) Patent No.: US 9,905,238 B2
(45) Date of Patent: *Feb. 27, 2018

(54) BACKWARD-COMPATIBLE COMMUNICATION SYSTEM COMPONENTS

(71) Applicant: HM ELECTRONICS, INC., Poway, CA (US)

(72) Inventor: David O'Gwynn, Ramona, CA (US)

(73) Assignee: HM Electronics, Inc., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,911

(22) Filed: Oct. 31, 2016

(65) Prior Publication Data

US 2017/0116998 A1 Apr. 27, 2017

Related U.S. Application Data

(63) Continuation of application No. 14/497,319, filed on Sep. 25, 2014, now Pat. No. 9,484,041.

(51) Int. Cl.
*G10L 19/22* (2013.01)
*H04L 29/02* (2006.01)
*H04W 60/00* (2009.01)
*H04W 88/08* (2009.01)

(52) U.S. Cl.
CPC .............. *G10L 19/22* (2013.01); *H04L 29/02* (2013.01); *H04W 60/00* (2013.01); *H04W 88/08* (2013.01)

(58) Field of Classification Search
CPC ..................................................... G10L 19/22
USPC ........................................................ 704/201
See application file for complete search history.

(56) References Cited

U.S. PATENT DOCUMENTS

| 6,108,560 | A | 8/2000 | Navaro |
| 6,421,527 | B1 | 7/2002 | DeMartin |
| 8,244,179 | B2 | 8/2012 | Dua |
| 8,265,255 | B1 | 9/2012 | Abrishami |
| 8,374,858 | B2 | 2/2013 | Fejzo |
| 8,515,412 | B2 | 8/2013 | Choi-Grogan |
| 8,553,865 | B2 | 10/2013 | Menard |
| 9,042,349 | B1 | 5/2015 | Oroskar et al. |
| 9,408,022 | B1 | 8/2016 | O'Gwynn |
| 9,484,041 | B1 * | 11/2016 | O'Gwynn ............... G10L 19/22 |
| 2003/0063569 | A1 | 4/2003 | Kalliokulju |

(Continued)

FOREIGN PATENT DOCUMENTS

| EP | 1137209 | 9/2001 |
| EP | 1915878 | 8/2013 |
| EP | 2418780 | 5/2014 |

*Primary Examiner* — Susan McFadden
(74) *Attorney, Agent, or Firm* — Sheppard Mullin Richter & Hampton LLP

(57) ABSTRACT

A base station for use in a communication system is configured to determine whether a set of access information provided by an end unit is acceptable to the base station. The access information facilitates identification by the base station of one or more codecs used by the end unit to encode and decode digital audio signals. Other end units may use different codecs to encode and decode digital audio signals. The base station is configured to simultaneously handle multiple different codecs. The communication system also comprises at least one end unit configured to determine the codec used by the base station, request registration to the base station, and set the determined codec as the codec to use for communications with the base station.

16 Claims, 8 Drawing Sheets

(56) References Cited

U.S. PATENT DOCUMENTS

| | | |
|---|---|---|
| 2006/0174015 A1 | 8/2006 | Arauz-Rosado |
| 2006/0258289 A1 | 11/2006 | Dua |
| 2014/0162558 A1 | 6/2014 | Dua |
| 2014/0273833 A1 | 9/2014 | McCormack |
| 2016/0171575 A1 | 6/2016 | Bowles |

* cited by examiner

BACKWARD-COMPATIBLE COMMUNICATION SYSTEM COMPONENTS

FIELD OF THE DISCLOSURE

This disclosure relates to backward-compatible communication systems and, in particular, backward-compatible communication system base stations and end units.

BACKGROUND

Communication systems typically have multiple end units able to receive and/or transmit audio signals. The audio signals received and/or transmitted by and/or to the end units of a communication system may be voice signals from users of the communication system. Communication systems may be analogue and/or digital, wherein the communication systems are configured to transmit analogue and/or digital audio signals. Communication systems can be either wired or wireless. Wireless communication systems allow for the transmission of audio signals between the various components of a communication system without having to also connect the communication system components with wires to carry the audio signals. Wireless communication components may transmit audio signals between the wireless communication systems in analogue and/or digital format.

Digital voice communication systems may typically convert speech signals from a user of the communication components into digital signals. These digital signals may then be transmitted via radio or over wires from one point on the digital voice communication system to another. The speech from the user may be received by the communication system component through a microphone associated with the communication system component used by the user, the transmitting communication system component. The microphone may convert the speech into a signal representing the speech, and the signal representing the speech may be digitized into digital data. The digital data may be transmitted from the transmitting communication system component to a receiving communication system component. At the receiving communication system component, the digital data may be converted back to a signal representing the speech of the user. The signal representing the speech may be sent to a speaker near a second user of the digital communication system, and the speaker may convert the speech signal into speech audible to the second user.

Digital signals may be transmitted with less degradation than analogue signals because digital communication systems are often simpler and easier to implement than equivalent analogue systems. Data representing speech must be transmitted serially. When raw digitized speech is transmitted serially, the data rate can be so high that channel spectral efficiency is poor. It is thus advantageous to process the raw digitized speech to reduce the data rate prior to transmission.

Typical digital voice communication systems use encoders and/or decoders to encode and/or decode digital audio signals. The encoders and/or decoders may also reduce the amount of data that is to be transmitted, thus saving spectrum bandwidth.

The transmitting communication system component may digitize the speech signal and then encode the speech signal into encoded digital speech signals for digitally transmitting to the receiving communication system component. The receiving communication system component may decode the encoded digital speech signals back to digitized speech signals, which may then be converted to analogue audible speech signals for transmission by the receiving communication system component.

Encoding and decoding digital speech signals is typically performed by voice encoders (vocoders) or coder/decoders (codecs). As used herein, the term codec will be used to refer to codecs, vocoders, and/or other encoders and/or decoders. For the encoded digital speech data transmitted by the transmitting digital communication component to be decoded by the receiving digital voice communication component, the codecs used by the transmitting and receiving digital voice communication components must agree on the type of encoding to use and the transmission data rate.

Digital voice communication components typically contain a codec for encoding and/or decoding speech. Typically, each of the communication components in a digital voice communication system must contain the same type of codec. Due to codecs being configured to process speech signals in individualized ways, different types of digital voice communication components having different codecs are typically incompatible.

SUMMARY

One aspect of the disclosure relates to a base station for use in a communication system. The base station may comprise an audio processor configured to encode and/or decode digital audio signals. The digital audio signals may be encoded and/or decoded using codecs stored on the base station. The codec(s) may be stored in the audio processor. The audio processor may be hardware, software, firmware, or a combination thereof. The base station may store and use multiple codecs. The base station may be configured to select, from the multiple codecs stored on the base station, a codec(s) that corresponds to a codec(s) that are used by one or more communication end units. The selection may be performed by software, firmware, hardware, and/or a combination thereof.

In a communication system designed to support multiple codecs, additional information may have to be transmitted between communication system end units informing them of the codec in use for that audio signal. Where the communication system is a wireless communication system, transmitting additional information typically consumes additional channel bandwidth in the system.

The radio communication spectrum is limited. Therefore, there is a desire to find ways of transmitting speech while using lower data rates and thus less radio spectrum. The same can be true of wired network communications as well. The desire to transmit speech while using lower data rates drives the development of codecs which code speech to provide encoded digital speech signals requiring less data to be transmitted, thereby lowering the data rates associated with the speech and freeing up channel bandwidth. The freed channel bandwidth may be used for transmitting additional information, additional speech signals, and/or for other uses. New codecs are typically incompatible with previously existing codecs. Incompatible codecs lead to incompatible communication system components. When an owner of a communication system wishes to upgrade one or more of the communication system components, such as the base station or an end unit, the owner may be required to upgrade all of the communication system components to ensure compatibility.

As an example, a first digital communication system may use a first codecs, such as G.726 speech codec. The end units of such a digital communication system are configured to decode speech data they receive from other components using the G.726 speech codec. A second digital communication system might be provided using a second codec, such as BV32 speech codec. The end units of the second system would be configured to encode and/or decode the digital speech data using the second codec, i.e., the BV32 speech codec. The first and second digital communication systems may use the same radio or network technology. However, the end units designed for each system may be incompatible with the components of the other system.

Where a communication system has sufficient bandwidth in its data stream, it may be possible to communicate to an end unit the type of encoding that is being used for the speech. In such systems, an end unit may be configured to select an appropriate codec based on information contained in the data stream about the encoding. Where a communication system has insufficient bandwidth in its data stream, whether wired or wireless, it may not be possible for such communications systems to communicate to an end unit the type of encoding that is being used for the speech data. End units that are incapable of detecting which codec was used to encode the speech would be incompatible with systems using different codecs from those end units.

Owners of communication systems may not wish to replace all of their communications equipment at one time. Owners may desire to replace only certain components such as a base station or some number of end units. It is therefore desirable for new communications end units to work with older systems and for old communications end units to work with newer systems. Base stations and end units may be provided that are configured to communicate with communication components that may not be capable of selecting appropriate codecs based on an indication of the codec used that accompanies the speech data transmitted to them.

The base station may comprise a registration component. The registration component may be software, firmware, hardware, and/or a combination thereof. The registration component may be configured to receive registration requests. The registration requests may be received from communication system end units. The communication system end units may be configured to encode and/or decode digital audio signals using one or more codecs. The communication system end units may comprise access information. The access information may be provided with the registration request from the communication system end unit. For example, a first communication system end unit may comprise a first set of access information. The first communication system end unit may provide the first set of access information with the registration request to the base station. The access information provided by the communication system end units may facilitate the identification, by the base station, of the codec(s) used by the communication system end unit to encode and/or decode digital audio signals.

Access information can be any type of information associated with the communication system end unit, the communication system base station and/or other components of the communication system. Access information may include an access code. The access code may provide an indication of the identity of the communication system end unit. The access code may provide an indication of the type or model of the communication system end unit. The access code may provide an indication of the codec used by the communication system end unit to encode and/or decode audio signals.

The base station may comprise a verification component. The verification component may be configured to determine whether the access information provided by the end unit is acceptable to the base station. The base station may only accept selected access information corresponding to one or more codec(s) stored on the base station.

The registration component may be configured to record the access information provided by the communication system end unit. The registration component may be configured to record an indication of the codec(s) used by the communication system end units that correspond to one or more codec(s) stored on the base station. The registration component may be configured to record such information in response to the verification component determining that the set of access information supplied by the communication system end units corresponds to one of the sets of access information accepted by the base station.

Recording an indication of the codec(s) used by the communication system end units may facilitate communication between the communication system end units and the base station using the recorded codec(s).

The one or more components of the base station may be software, hardware, firmware and/or a combination thereof. The functions performed by the components may be performed by a single component or a combination of components.

The codec(s) stored on the base station may comprise a codec configured to support wideband audio. The codec(s) stored on the base station may comprise a codec configured to support narrowband audio signals.

The base station may be configured to manage multiple communication channels. The base station may comprise a communication channel manager. The communication channel manager may be configured to assign communication channels to the communication system end units. The registration component may be configured to associate the codec(s) used by the communication system end units. The registration component may be configured to associate the access information provided by the communication system end units with the assigned communication channels. For example, the first communication system end unit may be assigned to a first communication channel managed by the base station. The codec(s) used by the first communication system end unit may be associated with the first communication channel. The first set of access information provided by the first communication system end unit may be associated with the first communication channel.

The codec(s) used by the first communication system end unit to encode and/or decode audio signals may be a first codec(s). The registration component may be configured to receive registration requests from a second communication system end unit. The second communication end unit may be configured to encode and/or decode digital audio signals using a second codec(s) different from the first codec(s). The second communication system end unit may comprise a second set of access information. The second communication system end unit may provide the second set of access information with the registration request to the base station. The second set of access information provided by the second communication system end unit may facilitate the identification, by the base station, of the codec(s) used by the second communication system end unit to encode and/or decode digital audio signals.

The verification component may be configured to determine whether the second set of access information supplied by the second communication system end unit corresponds to one of the sets of access information accepted by the base station.

The registration component may be configured to record the second set of access information provided by the second communication system end unit. The registration component may be configured to record an indication of the second codec(s) used by the second communication system end unit that corresponds to one or more codec(s) stored on the base station. The registration component may perform such functions in response to the verification component determining that the second set of access information supplied by the second communication system end unit corresponds to one of the sets of access information accepted by the base station.

Recording an indication of the second codec(s) used by the second communication system end unit may facilitate communication between the communication system end unit and the base station using the second codec(s).

The transceiver of the base station may be configured to receive digital audio signals originating from the first end unit. The audio processor of the base station may be configured to decode the digital audio signals using the first codec(s). The audio processor may be configured to encode the digital audio signals using the second codec(s). The transceiver may be configured to transmit the digital audio signals to the second end unit.

A communication system may comprise a base station and at least two end units of the type herein described, such as a first end unit and a second end unit. The first end unit may be configured to encode and/or decode audio signals using a first codec(s). The second end unit may be configured to encode and/or decode audio signals using a second codec(s). The base station may be configured to receive the audio signals transmitted by the first end unit that have been encoded using the first codec. The base station may be configured to decode the audio signals using the first codec. The base station may be configured to encode the audio signals using the second codec for transmission by the base station to the second end unit.

In some implementations, the one or more codecs used by base station may include a first codec and a second codec different from the first codec. In response to a registration request received from a communication system end unit using the first set of access information, the base station may be configured to set the first codec as the codec to use by the base station.

A user may configure the registration component to accept only the first set of access information. A user may configure the registration component to accept only the second set of access information. A user may configure either set of access information. In response to a registration request received from a communication system end unit using the first set of access information, the registration component may be configured to accept only the first set of access information. In response to being configured to accept only the first set of access information, the base station may be configured to set the first codec as the codec to be used by the base station.

The registration component may be configured to receive registration requests from a second communication system end unit. The second communication system end unit may be configured to encode and/or decode digital audio signals using a second codec(s) different from the first codec(s). The second communication system end unit may comprise a second set of access information. The second communication system end unit may provide the second set of access information with the registration request to the base station. The second set of access information provided by the second communication system end unit may facilitate the identification by the base station of the codec(s) used by the second communication system end unit to encode and/or decode digital audio signals.

The verification component may be configured to determine whether the second set of access information supplied by the second communication system end unit corresponds to the first set of access information used by the first communication system end unit and stored on the base station. The verification component may be configured to reject the registration of the second communication system end unit in response to determining that the second set of access information does not correspond with the first set of access information.

The access information provided by the communication system end units may facilitate determination of the capabilities of the communication system end units. The registration component may be configured to identify the capabilities of the communication system end units based on the access information provided by the communication system end units.

The communication system end units may comprise one or more capabilities. The one or more capabilities of the communication system end units may include triggering one or more functions of the communication system base unit. A first communication system end unit may comprise a first capability configured to trigger a first function of the communication system base station. A second communication system end unit may comprise a second capability configured to trigger a second function of the communication system base station.

The access information provided by the first communication system end unit may facilitate a determination of capabilities of the first communication system end unit. The access information provided by the second communication system end unit may facilitate a determination of capabilities of the second communication system end unit. The registration component may be configured to record an indication of the capabilities of the first communication system end unit and the second communication system end unit.

Another aspect of the disclosure relates to a communication system end unit. The communication system end unit may comprise an audio processor. The audio processor may be configured to encode and/or decode digital audio signals using codecs stored on the end unit. Individual ones of the codecs may be associated with individual sets of access information.

The communication system end unit may comprise a communication component. The communication component may be configured to facilitate communication with a communication system base station. The base station may comprise a base station audio processor configured to encode and/or decode audio signals using one or more codecs.

The communication system end unit may comprise an access selector. The access selector may be configured to select a set of access information. The access information may facilitate a determination, by the base station, of compatibility of the communication system end unit with the base station. The access selector may select a first set of access information.

The access selector may be configured to select a set of access information automatically. The access selector may be configured to select a set of access information automatically in response to a user request to register with one or more other communication system elements. The one or more other communication system elements may comprise a base station, an end unit, or other communication system elements. The access selector may be configured to be set by an operator of the communication system and/or communication system component. The access selector may facilitate selection and/or entry by the user of an indication to use a desired set of access information. For example, the access selector may facilitate selection and/or entry by a user of the system an indication to use the first set of access information, the second set of access information and/or another set of access information.

Having the access selector configured to facilitate selection and/or entry by the user may provide utility to a user who desires to register the communication system element to another communication system element of a particular known type. The user may select and/or enter an indication to use a known corresponding set of access information.

The communication system end unit may comprise a registration component. The registration component may be configured to provide a registration request to the base station. The registration request may comprise the selected set of access information.

The communication system end unit may comprise a verification component. The verification component may be configured to determine whether the base station has accepted the registration request from the communication system end unit using the selected set of access information.

In response to a determination that the base station accepted the registration request from the communication system end unit using the selected set of access information, the registration component may be configured to record an indication to use the corresponding codec when communicating with the base station. For example, in response to a determination that the base station accepted the registration request from the first communication system end unit using the first set of access information, an indication may be recorded to use the first codec when communicating with the base station.

In response to a determination that the base station has rejected the registration request from the communication system end unit using the selected set of access information, the access selector may be configured to select a different set of access information. For example, the access selector may select a second set of access information, and the registration component may provide a registration request to the base station, wherein the registration request comprises the second set of access information.

The communication system end unit may use the first codec(s) to encode and/or decode speech. The communication system end unit may be configured to receive digital audio signals through a base station. The digital audio signals may be encoded using the first codec(s) by a second end unit. The encoded digital audio signals may be transmitted from the second end unit to the base station. The digital audio signals may be transmitted from the base station to the first end unit.

The communication system end units may be configured to transmit and receive digital audio signals from one or more other end units, wherein the audio signals are encoded using the first codec(s).

The end unit may further comprise a speaker. The end unit may be configured to convert the decoded digital audio signals to analogue audio signals. The end unit may be configured to send the analogue audio signals to the speaker.

The end unit may comprise a microphone. The microphone may be configured to receive audio signals. The end unit may be configured to digitize the audio signals from the microphone. The end unit may be configured to encode the digital audio signals. The end unit may be configured to transmit the encoded digital audio signals to the base station.

Another aspect of the disclosure relates to a method of registering communication system end units to a base station. The method may comprise receiving registration requests at the base station from communication system end units. The communication system end units may be configured to encode and/or decode digital audio signals using one or more codecs. The communication system end units may comprise access information that is provided with the registration request. For example, a first communication system end unit may comprise a first set of access information. The first communication system end unit may provide the first set of access information with the registration request to the base station. The access information provided by the communication system end units may facilitate the identification by the base station of the codec(s) used by the communication system end units to encode and/or decode digital audio signals.

The method may comprise verifying whether the set of access information supplied by the communication system end units correspond to one of the sets of access information accepted by the base station.

The method may comprise recording the access information provided by the communication system end units. The method may comprise correlating the access information provided by the communication system end units with one or more codecs stored on the base station. The method may comprise recording an indication of the codec(s) that correlates with the access information provided by the communication system end units, wherein the codec(s) are stored on the base station.

Recording an indication of the codec(s) used by the communication system end units may facilitate communication between the communication system end units and the base station using the recorded codec(s).

Another aspect of the disclosure relates to a communication system end unit and a communication system base station. The communication system end unit and the communication system base station may be configured to encode and/or decode digital audio signals using multiple codecs. The registration component of the base station may be configured to register the communication system end unit. The registration component of the base station may be configured to record an indication that the communication system end unit is configured to encode and/or decode digital audio signals using multiple codecs. The communication system end unit may be configured to communicate with the base station over a first channel using a first codec. The communication system end unit may be configured to communicate with the base station over a second channel using a second codec. Communications over the first channel may have a first characteristic. Communications over the second channel may have a second characteristic different from the first characteristic. As an example, the first characteristic may be that the communication is public communication. The second characteristic may be that the communication is private communication.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
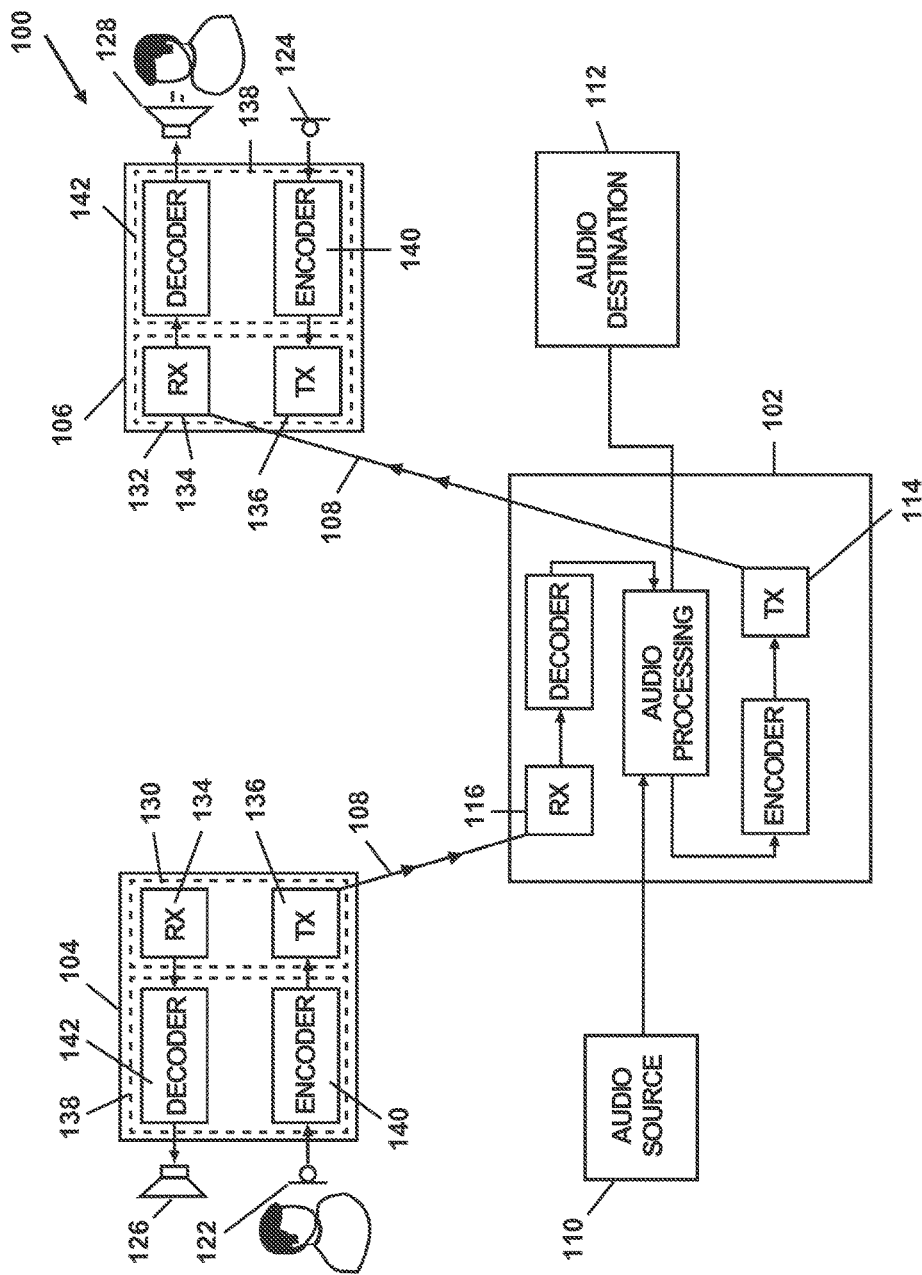
FIG. 1 illustrates a voice communication system, in accordance with one or more implementations.

FIG. 1 illustrates a communication system 100, in accordance with one or more implementations. The communication system 100 may comprise a base station 102 and one or more communication end units 104, 106. The end units 104, 106 may have one or more connections 108 with the base station 102. The one or more connections 108 may comprise one or more of a radio link, a wire, an optical connection, and other connections. The base station 102 may include inputs from auxiliary information sources 110. The inputs may be direct inputs. The auxiliary information sources 110 may include microphones, telephone interfaces, computers, audio inputs, and/or other information sources. The base station 102 may also include outputs to auxiliary destinations 112. The outputs may include direct outputs. Auxiliary destinations 112 may include speakers, telephone interfaces, computers, audio outputs, and/or other destinations.

Figure 2:
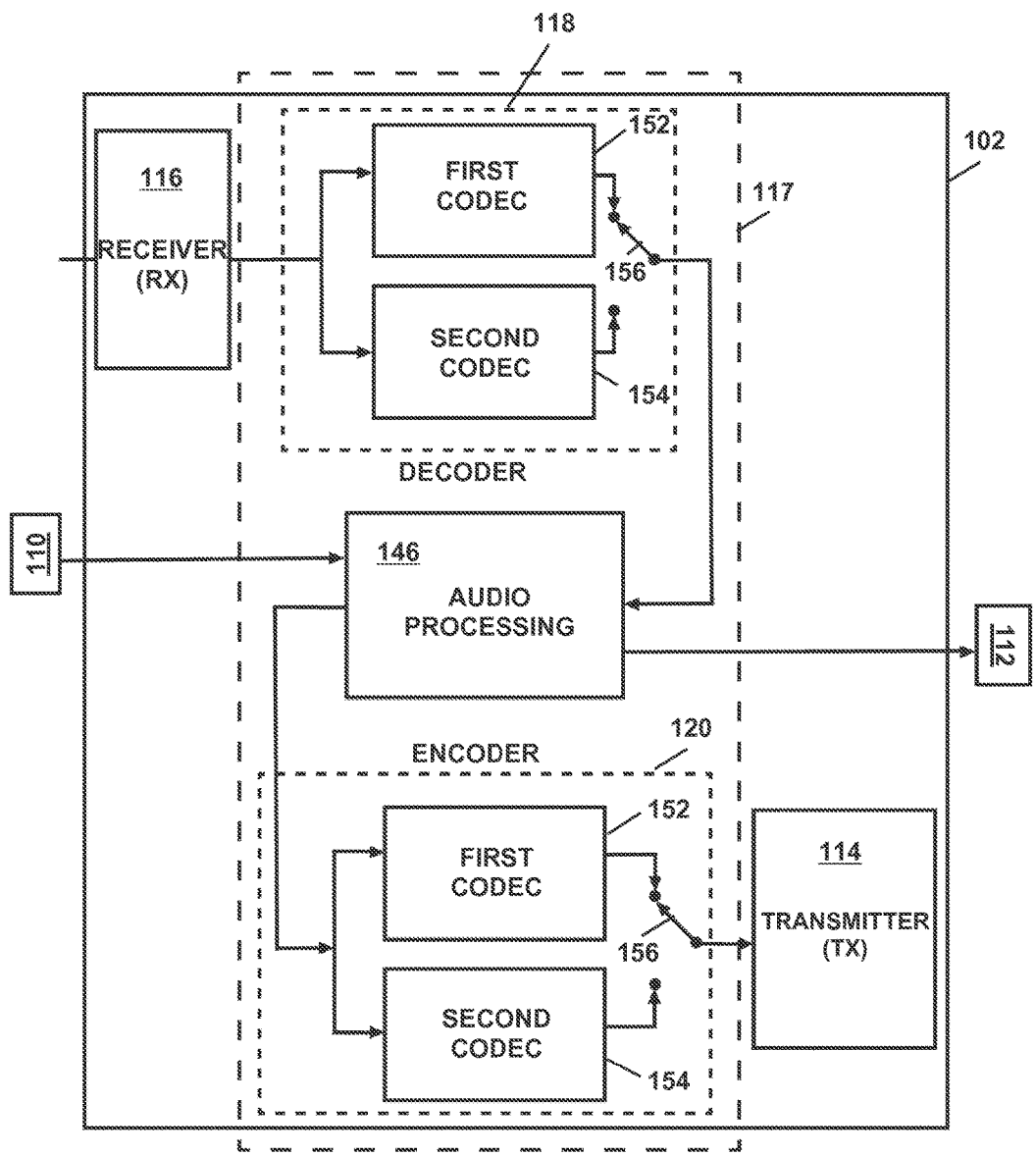
FIG. 2 illustrates base station, in accordance with one or more implementations.

With reference to FIG. 2, the base station 102 may comprise an audio processor 117 configured to encode and/or decode digital audio signals. The audio processor 117 may be a computer processor configured to implement one or more computer-readable instructions. The audio processor 117 may be hardware. The audio processor 117 may be firmware. The audio processor 117 may be a combination of one or more of software, hardware, and/or firmware. The base station 102 may comprise a transceiver. The transceiver may comprise a transmitter 114 configured to transmit audio signals. The audio signals transmitted by the transmitter 114 may include encoded digital audio signals. The transceiver may comprise a receiver 116 configured to receive audio signals. The received audio signals may include encoded digital audio signals. The audio processor 117 of the base station 102 may comprise a decoder 118 configured to decode encoded digital audio signals. The audio processor 117 of the base station 102 may comprise an encoder 120 configured to encode digital audio signals. In some implementations, the functions herein described as occurring in the audio processor 117 may be performed by the transceiver. In some implementations, the transceiver may include the audio processor 117. The functions may be performed by software, hardware, firmware and/or a combination thereof.

The digital audio signals may be encoded and/or decoded using codecs stored on the base station 102. In some implementations, the codecs may be stored in the audio processor 117. In some implementations, the codecs may be implemented with hardware. The base station 102 may store and use multiple codecs. The base station 102 may be configured to select, from the multiple codecs stored on the base station 102, a codec(s) that corresponds to a codec(s) that is used by one or more communication end units 104, 106. The one or more codecs may consist of speech encoder(s) and speech decoder(s).

Figure 4:
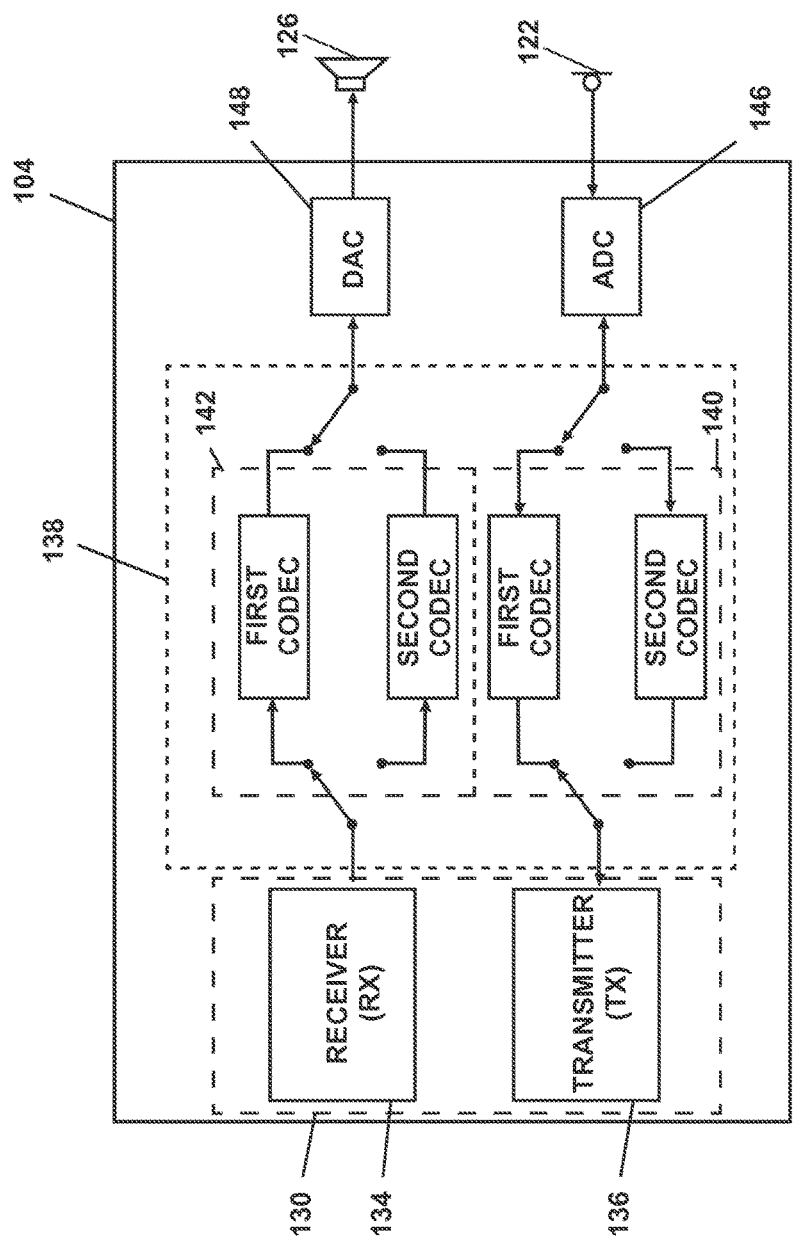
FIG. 4 illustrates an end unit, in accordance with one or more implementations.

With reference to FIGS. 1 and 4, the end units 104, 106 may include one or more inputs 122, 124. The first end unit 104 may comprise a first input 122. The second end unit 106 may comprise a second input 124. The inputs 122, 124 may be microphones. The end units 104, 106 may include one or more outputs 126, 128. The first end unit 104 may comprise a first output 126. The second end unit 106 may comprise a second output 128. The first output 126 and the second output 128 may comprise speakers, earpieces and/or other audio outputs.

The end units 104, 106 may comprise a transceiver 130, 132. The transceivers 130, 132 may comprise a receiver 134. The transceivers 130, 132 may comprise a transmitter 136. The transceivers 130, 132 may be configured to transmit and/or receive audio signals between the end units and the base station 102. The transceivers 130, 132 may be configured to transmit and/or receive audio signals between end units. The audio signals may be encoded digital audio signals. The first end unit 104 may be configured to transmit and/or receive audio signals to and/or from the second end unit 106. The audio signals may be transmitted through the base station 102. The audio signals may be transmitted through the base station 102 to direct output destinations 112.

The end units 104, 106 may include one or more end unit audio processors 138. The end unit audio processors 138 may comprise encoder(s) 140 and/or decoder(s) 142. The encoder(s) and/or decoder(s) may be configured to encode and decode digital audio signals using one or more codecs. Audio speech signals may be transmitted from an end unit 104. The audio speech signals may be received by the microphone 122 and digitized using an analogue to digital converter 146. The digital audio signal may be encoded by an encoder 140. The digital audio signal may be encoded using a codec(s). The encoded digital audio signal may be transmitted by transmitter 136. Digitizing and encoding the audio signal using a codec(s) may reduce the amount of data to be transmitted. This encoded digital audio signal may be transmitted by the transmitter 136 of the first end unit to the base station 102. In some implementations, the encoded digital audio signal may be transmitted by the transmitter 136 of the first end unit to the second end unit 106. In some implementations, the audio signals may be encoded and/or decoded using hardware, software, firmware and/or a combination thereof. The codecs may be provided by hardware configured to encode and/or decode audio signals. It is to be understood that while only two codecs are shown in decoder 142 and encoder 140, this is not limiting and any number of codecs could be provided.

The base station 102 may receive the encoded digital audio signal from the first end unit 104 through the receiver 116 of the base station 102. The base station 102 may be configured to decode the encoded digital audio signal using one or more codecs 118 stored on the base station 102. The codec(s) 118 may be configured to decode the encoded digital audio signals into linear digital audio. The base station 102 may perform processing on the speech. The base station 102 may be configured to encode the linear audio signals. The audio signals may be encoded by encoder 120. The base station 102 may be configured to transmit the encoded audio signals to other end units. The encoded audio signals may be transmitted by a transmitter 114 of the base station 102. For example, the base station 102 may be configured to transmit the digital audio signals to the second end unit 106.

Upon receiving encoded digital audio signals, the end units 104, 106 may be configured to decode the encoded digital audio signals. The encoded digital audio signals may be decoded by an audio processor 138. The audio processor 138 may comprise a decoder(s) 142. The end units 104, 106 may be configured to convert the digital audio signals to an analogue form. The digital audio signals may be converted to an analogue form using a digital to analogue converter 148. The end units 104, 106 may be configured to transmit the analogue audio signals through the speaker and/or earpiece 124 of the end units 104, 106. The speaker and/or earpiece 124 may comprise the digital to analogue converter. The microphone 122 may comprise the analogue to digital converter.

Such base stations and/or end units may be compatible with other end units and/or base stations. The base stations and/or end units may be configured to select codec(s) to use based on information obtained at the time the end units are registered to the system. By determining which codec(s) to use at the time the end units are registered to the system, there is no need to transmit additional information regarding the codec(s) through communications channels associated with the end units.

In some implementations, the base station 102 may be configured to register a first end unit 104 that uses a first codec. Subsequently, the base station 102 may be configured to register additional end units that use the first codec. The base station 102 may be configured to reject registration of an end unit that uses a codec different from the first codec.

In some implementations, the base station 102 may be configured to register a first end unit 104 that uses a first codec. Subsequently, the base station 102 may be configured to register additional end units that use codecs comprising the first codec, a second codec, and/or other codecs.

Figure 3:
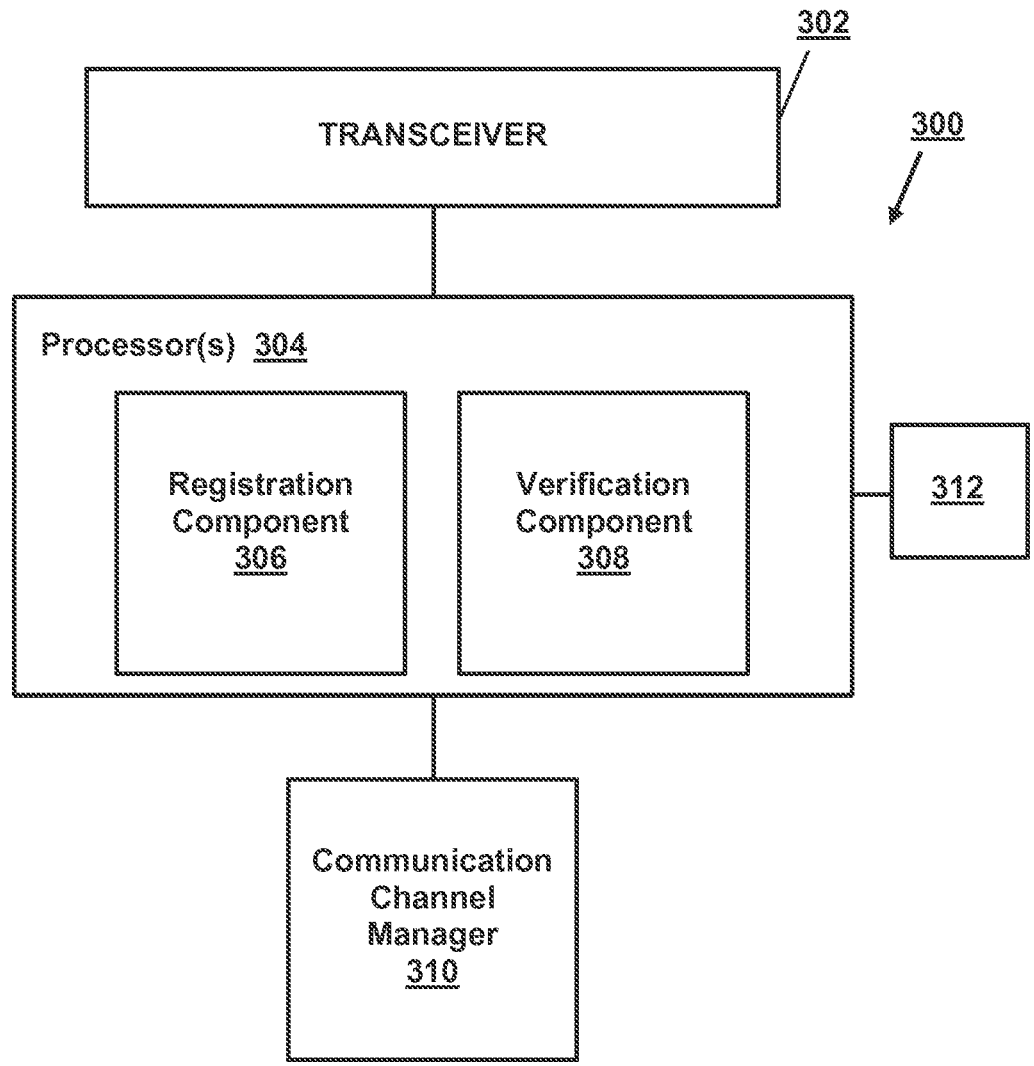
FIG. 3 illustrates processing systems for use in communication system components, in accordance with one or more implementations.

FIG. 3 illustrates a processing system 300 for use in communication systems, in accordance with one or more implementations. The processing system 300 illustrated in FIG. 3 may be implemented by a computer processor configured to execute commands provided by machine-readable instructions. The processing system 300 illustrated in FIG. 3 may be a physical processing system configured to execute commands using hardware. The components described herein may be functionality provided by software, hardware, firmware, other processes, and/or a combination thereof.

In some implementations, the base station 102 may comprise a transceiver 302. The base station 102 may comprise one or more physical computer processors 304. The one or more physical computer processors 304 may be co-located in the base station. The one or more physical computer processors 304 may be located in different elements of the base station 102. For example, one or more of the processors 304 may be included in the transceiver 302.

The physical computer processors 304 may be configured by machine-readable instructions to perform one or more functions. The machine-readable instructions may be conceptually thought of as components configured to perform functions. The processors may be configured to execute one or more computer components. The one or more components may comprise a registration component 306, a verification component 308, and/or other components. It is to be understood that while these components are shown separately, it is possible to combine these functions into fewer components. For example, some implementations may combine the functions of the registration component 306 and the verification component 308 into a single component.

The registration component 306 may be configured to receive registration requests from one or more end units. The communication system end units may be configured to encode and/or decode digital audio signals using one or more codecs. The communication system end units may comprise access information. The access information may be transmitted to the base station with the registration request. For example, a first communication system end unit may comprise a first set of access information. The first set of access information may be transmitted to the base station with the registration request. The access information may provide an indication of the identity of an individual communication system end unit. The access information may provide an indication of the type, capabilities, and/or other parameters of the communication system end unit.

The access information provided by the communication system end units may facilitate the identification by the base station of the codec(s) used by the communication system end units to encode and/or decode digital audio signals.

The verification component 308 may be configured to determine whether the set of access information supplied by the communication system end unit corresponds to of the sets of access information accepted by the base station.

The registration component 306 may be configured to record the access information provided by the communication system end units. The registration component 306 may be configured to record an indication of the codec(s) used by the communication system end units that corresponds to one or more codec(s) stored on the base station. The registration component 306 may perform such functions in response to the verification component 308 determining that the set of access information supplied by the communication system end units corresponds to one of the sets of access information accepted by the base station.

Recording an indication of the codec(s) used by the communication system end units may facilitate communication between the communication system end units and the base station using the recorded codec(s).

The codec(s) used by the first communication system end unit to encode and/or decode audio signals may be a first codec(s). The registration component 306 may be configured to receive registration requests from a second communication system end unit. The second communication end unit may be configured to encode and/or decode digital audio signals using a second codec(s) different from the first codec(s). The second communication system end unit may comprise a second set of access information. The second communication system end unit may provide the second set of access information with the registration request to the base station. The second set of access information provided by the second communication system end unit facilitates the identification by the base station of the codec(s) used by the second communication system end unit to encode and/or decode digital audio signals.

The verification component 308 may be configured to determine whether the second set of access information provided by the second communication system end unit corresponds to one of the sets of access information accepted by the base station. The registration component 306 may be configured to record the second set of access information provided by the second communication system end unit. The registration component 306 may be configured to record an indication of the second codec(s) used by the second communication system end unit that corresponds to one or more codec(s) stored on the base station. The registration component 306 may be configured to perform such functions in response to the verification component determining that the second codec(s) used by the second communication system end unit corresponds to one or more of the codecs stored on the base station.

Recording an indication of the second codec(s) used by the second communication system end unit may facilitate communication between the communication system end unit and the base station using the second codec(s).

The base station may be configured to manage multiple communication channels. The processor(s) 304 may comprise a communication channel manager 310. In some implementations, the functionality of the communication channel manager 310 may be provided by hardware. In some implementations, the functionality of the communication channel manager 310 may be provided individually or by a combination of software, hardware, firmware, and/or other elements.

The communication channel manager 310 may be configured to assign communication channels to the communication system end units. The registration component 306 may be configured to associate the codec(s) used by the communication system end units and the access information provided by the communication system end units with the assigned communication channels. For example, the first communication system end unit may be assigned to a first communication channel managed by the base station. The codec(s) used by the first communication system end unit and the first set of access information provided by the first communication system end unit may be associated with the first communication channel.

The transceiver 302 of the base station may be configured to receive digital audio signals originating from the first end unit. The audio processor of the base station may be configured to decode the digital audio signals using the first codec(s). The base station audio processor may be configured to encode the digital audio signals using the second codec(s). The transceiver 302 may be configured to transmit the digital audio signals to the second end unit.

The access information provided by the communication system end units may facilitate a determination of the capabilities of the communication system end units. The registration component 306 may be configured to identify the capabilities of the communication system end units based on the access information provided by the communication system end units. The access information provided by the first communication system end unit may facilitate a determination of capabilities of the first communication system end unit. The access information provided by the second communication system end unit may facilitate a determination of capabilities of the second communication system end unit. The registration component 306 may be configured to record an indication of the capabilities of the first communication system end unit. The registration component 306 may be configured to record an indication of the capabilities of the second communication system end unit.

The processing system 300 may comprise external resources 312. The external resources 312 may provide information regarding capabilities of one or more of elements of the communication system, such as the base station, communication system end units, and/or other elements.

Figure 5:
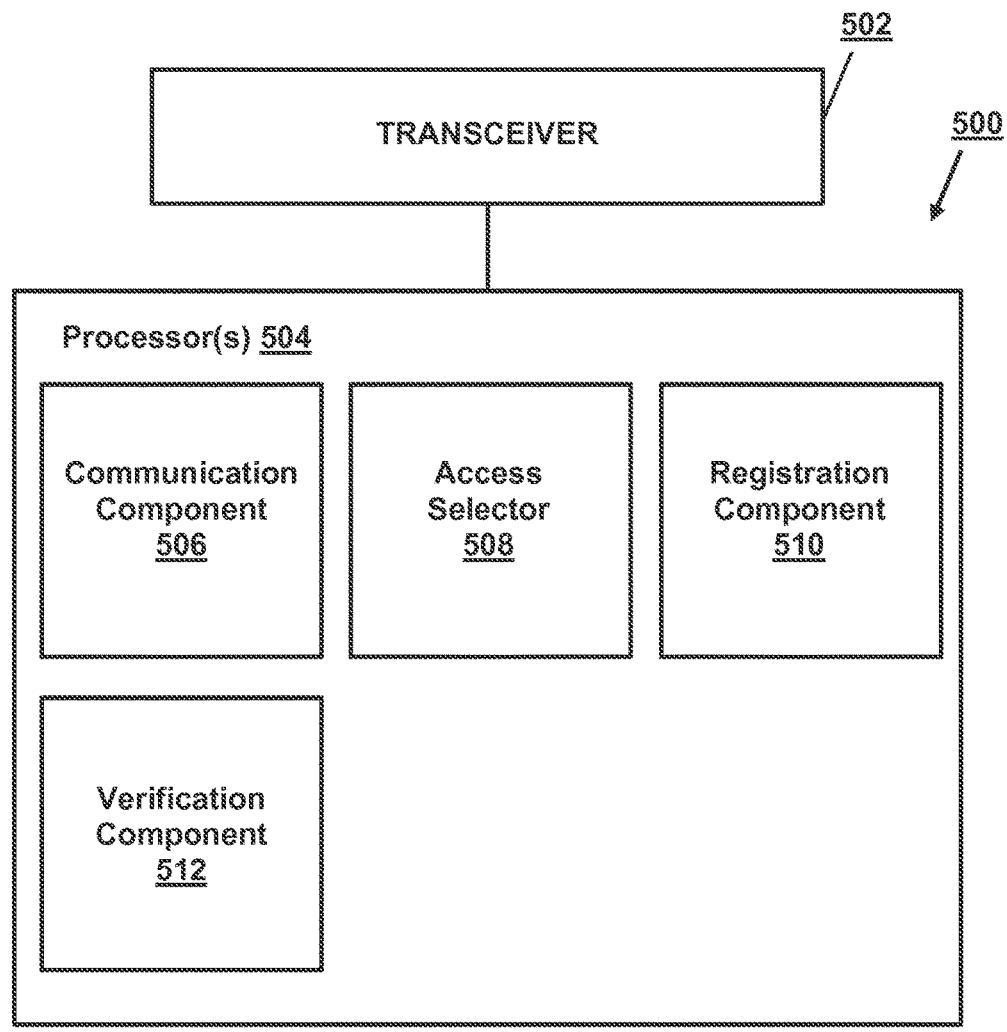
FIG. 5 illustrates processing systems for use in communication system end units, in accordance with one or more implementations.

FIG. 5 illustrates processing systems 500 for use in communication system end units, in accordance with one or more implementations. The processing system 500 may comprise a transceiver 502. The transceiver 502 may be configured to receive and/or transmit digital audio signals. The processing system 500 may comprise one or more processors 504. The processor(s) 504 may be configured to execute one or more computer components. The computer components may comprise a communication component 506, an access selector 508, a registration component 510, a verification component 512, and/or other components. The functionality of the processing system 500 may be provided by hardware, software, firmware, and/or a combination thereof. It is to be understood that while these components are shown separately, it is possible to combine these functions into fewer components. For example, some implementations may combine the functions of the access selector 508, the verification component 512, and the registration component 510 into a single component.

The communication component 506 may be configured to facilitate communication with a base station. The base station may comprise a base station configured to encode and/or decode audio signals using one or more codecs. In some implementations, the base station may store and use fewer codecs than the communication end unit.

The access selector 508 may be configured to select a set of access information. The access selector 508 may be configured to automatically select a set of access information. The access selector 508 may be configured to automatically select a set of access information in response to receipt of an indication to register with another communication system element and/or component. In some implementations, the access selector 508 may facilitate selection and/or entry of an indication to use a desired set of access information. The access selector 508 may select the desired set of access information indicated. The access information may facilitate a determination, by the base station, of compatibility of the communication system end unit with the base station. For example, the access selector may select a first set of access information from the access information of the communication system end unit.

The registration component 510 may be configured to provide a registration request to the base station. The registration request may comprise the selected set of access information.

The verification component 512 may be configured to determine whether the base station accepted the registration request from the communication system end unit using the selected set of access information.

In response to a determination that the base station accepted the registration request from the communication system end unit using the selected set of access information, the registration component 510 may be configured to record an indication to use the corresponding codec when communicating with the base station. For example, in response to a determination that the base station accepted the registration request from the first communication system end unit using the first set of access information, an indication is recorded to use the first codec when communicating with the base station.

In response to a determination that the base station rejected the registration request from the communication system end unit using the selected set of access information, the access selector 508 may be configured to select a different set of access information. The access selector 508 may be configured to select a different set of access information automatically. The access selector 508 may be configured to facilitate selection and/or entry of a different set of access information by a user. For example, the access selector may select a second set of access information, and the registration component 510 may provide a registration request to the base station, wherein the registration request comprises the second set of access information.

As used herein, the term codec may refer to a codec, multiple codecs, and/or combinations of codecs. For example, the first codec may be a combination of one or more codecs.

With reference to FIG. 2, in some implementations, the base station 102 may be configured to receive registration requests from end units that are configured to encode and/or decode audio signals using a first codec, a second codec, and/or any number of codecs (not shown).

The base station may comprise a decoder 118 and an encoder 120. The decoder 118 and encoder 120 may be the same item in the base station 102. The decoder 118 and encoder 120 may be separate items in the base station 102. The decoder 118 may use the same codecs to decode audio signals as the encoder 120 does to encode audio signals. The decoder 118 and encoder 120 being illustrated separately in FIG. 2 is not limiting, and the present disclosure is intended to cover any conceivable encoding and decoding system. Encoded audio signals received from the base station 102 may be routed to a decoder 118. The decoder may comprise two or more different codecs. Codecs as used herein are intended to cover decoders, encoders, and/or other manipulators of information. The decoder 118 of the base station may comprise a first codec 152 and a second codec 154. In some implementations, the decoder 118 may comprise a switch 156 that is configured to selectively allow the appropriate codec to supply decoded speech to the audio processing processor 146. The switch 156 may be a mechanical switch, an electrical switch, a semiconductor, a microprocessor, a transistor, and/or other type of switching device. It is to be understood that while only two codecs are shown in the encoder and in the decoder, this is not limiting and any number of codecs could be provided.

The processed audio and speech may be routed from the audio processing processor 146 to the encoder 120. The encoder may comprise one or more encoders. The encoder may comprise a first codec 152 and a second codec 154. The encoder 120 may comprise a switch 156 configured to selectively allow the appropriately encoded speech from the first codec 152 or the second codec 154 to be transmitted by the transmitter 114. Such a base station 102 may be configured to work with an end unit configured to encode and/or decode speech using either the first codec or the second codec.

The processors as illustrated in FIGS. 3 and 5 may be configured to execute computer program components. The processors may be configured to execute the computer program modules via one or more of hardware, software, and/or firmware. Processor(s) 304 and 504 may be configured to provide information processing capabilities in a communication system. As such, processors 304 and 504 may include one or more of a digital processor, an analog processor, a digital circuit designed to process information, an analog circuit designed to process information, a state machine, and/or other mechanisms for electronically processing information. Although processors 304 and 504 are shown in FIGS. 3 and 5 as single entities, this is for illustrative purposes only. In some implementations, processors 304 and 504 may include a plurality of processing units. These processing units may be physically located within the same device, or processors 304 and 504 may represent processing functionality of a plurality of devices operating in coordination.

Figure 6:
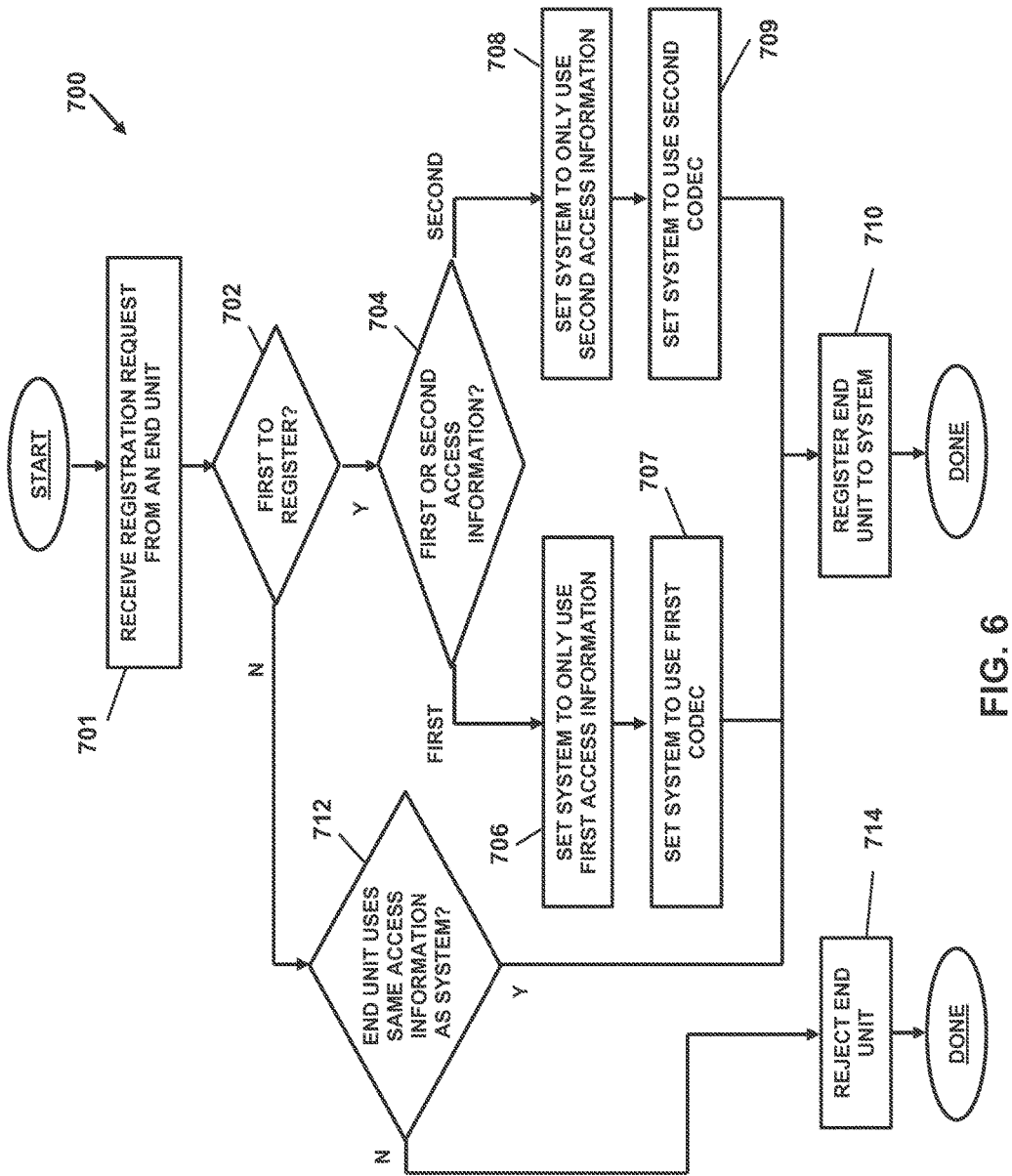
FIG. 6 illustrates a method of registering an end unit to a base station, in accordance with one or more implementations.

FIG. 6 illustrates a method 700 of registering an end unit to a base station, in accordance with one or more implementations. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 6 and described below is not intended to be limiting.

In some embodiments, method 700 in FIG. 6 illustrates a method of registering an end unit to a base station, in accordance with one or more implementations. Method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 701, a registration request may be received from a communication system end unit. Operation 701 may be facilitated by a registration component, such as registration component 306, in accordance with one or more implementations.

At an operation 702, a determination may be made whether or not the end unit is the first end unit to register to the base station. Operation 702 may be performed by a registration component, such as registration component 306, in accordance with one or more implementations.

At an operation 704, a determination may be made of which set of access information the end unit supplied as part of its registration request. Operation 704 may be performed by a verification component, such as verification component 308, in accordance with one or more implementations.

At an operation 706, in response to determining that the end unit used the first set of access information when registering, the base station may be set to only accept the first set of access information for further registrations. Operation 706 may be performed by a registration component, such as registration component 306, in accordance with one or more implementations.

At an operation 707, in response to setting the first set of access information, the base station may be set to use the first codec for all audio encoding and decoding. Operation 707 may be performed by a registration component, such as registration component 306, in accordance with one or more implementations.

At an operation 708, in response to determining that the end unit used the second set of access information when registering, the base station may be set to only accept the second set of access information for further registrations. Operation 708 may be performed by a registration component, such as registration component 306, in accordance with one or more implementations. It is to be understood that the disclosure of a first and second set of access information in this description is not intended to be limiting. The communication system herein contemplated is capable of using any number of sets of access information as well as codecs.

At an operation 709, in response to setting the second set of access information, the base station may be set to use the second codec for all audio encoding and decoding. Operation 709 may be performed by a registration component, such as registration component 306, in accordance with one or more implementations.

At an operation 710, in response to setting the codec of the base station based on the codec of the end unit, the end unit may be registered to the base station. Operation 710 may be performed by a registration component, such as registration component 306, in accordance with one or more implementations.

At an operation 712, in response to determining that the end unit is not the first end unit to be registered to the base station, a determination is made as to whether the end unit supplied the same set of access information as the base station has been set to accept. Operation 712 may be performed by a verification component, such as verification component 308, in accordance with one or more implementations.

At an operation 710, in response to determining that the end unit supplied the same access information as the base station has been set to accept, the end unit is registered to the base station. Operation 710 may be performed by a registration component, such as registration component 306, in accordance with one or more implementations.

At an operation 714, in response to determining that the end unit supplied a different set of access information than the base station is accepting, the end unit is rejected and not registered to the base station. Operation 714 may be performed by a registration component, such as registration component 306, in accordance with one or more implementations.

Figure 7:
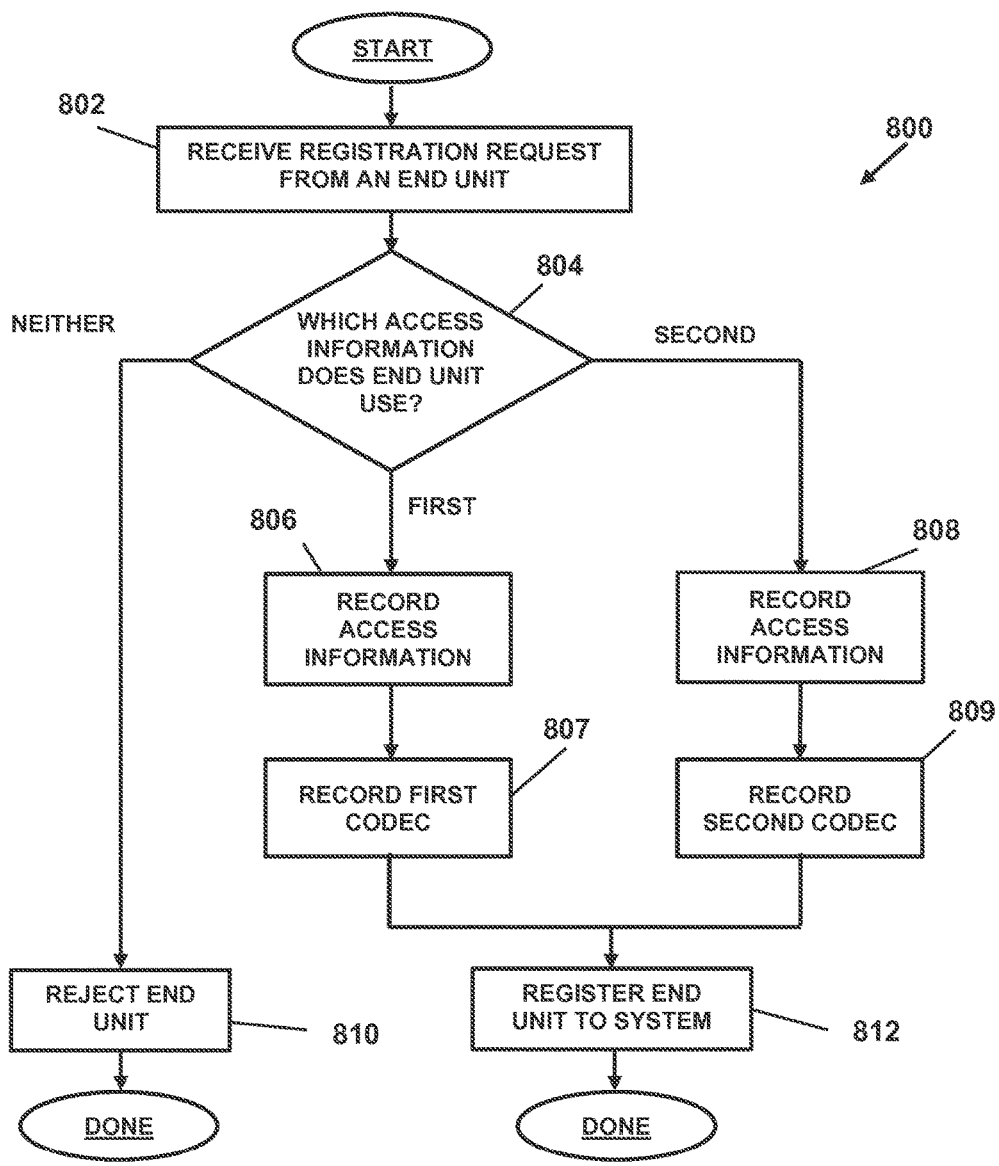
FIG. 7 illustrates a method of registering an end unit to a base station, in accordance with one or more implementations; and, FIG. 8 illustrates a method of registering an end unit to a base station, in accordance with one or more implementations.

FIG. 7 illustrates a method 800 of registering an end unit to a base station, in accordance with one or more implementations. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 7 and described below is not intended to be limiting.

In some embodiments, method 800 in FIG. 7 illustrates a method of registering an end unit to a base station, in accordance with one or more implementations. Method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, a registration request is received from a communication system end unit. Operation 802 may be facilitated by a registration component, such as registration component 306, in accordance with one or more implementations.

The communication system end units may be configured to encode and/or decode digital audio signals using one or more codecs. The communication system end units may comprise access information that is provided with the registration request. For example, a first communication system end unit may comprise a first set of access information and may provide the first set of access information with the registration request to the base station. The access information provided by the communication system end units may facilitate the identification by the base station of the codec(s) used by the communication system end units to encode and/or decode digital audio signals.

At an operation 804, a determination of the set of access information used by the end unit is made. At an operation 804, a verification of whether the set of access information used by the communication system end unit corresponds to one or more of the sets of access information accepted by the base station may be made. The function(s) at operation 804 may be performed by a verification component, such as verification component 308, in accordance with one or more implementations.

At an operation 806, in response to determining that the end unit uses a first set of access information, an indication that the end unit uses the first set of access information may be recorded by the base station. Operation 806 may be performed by a registration component, such as registration component 306, in accordance with one or more implementations.

At an operation 807, in response to recording the use of the first set of access information, an indication that the end unit uses a first codec may be recorded by the base station. The codec may be any type of codec. Operation 807 may be performed by a registration component, such as registration component 306, in accordance with one or more implementations.

At an operation 808, in response to determining that the end unit uses a second set of access information, an indication that the end unit uses the second set of access information may be recorded by the base station. Operation 808 may be performed by a registration component, such as registration component 306, in accordance with one or more implementations.

At an operation 809, in response to recording the use of the second set of access information, an indication that the end unit uses a second codec may be recorded by the base station. The codec may be any type of codec. Operation 809 may be performed by a registration component, such as registration component 306, in accordance with one or more implementations.

At an operation 810, in response to determining that the end unit uses an unrecognized set of access information, the base station may reject the registration of the end unit. Operation 810 may be performed by a registration component, such as registration component 306, in accordance with one or more implementations.

At an operation 812, in response to recording the type of codec used by the end unit, the end unit may be registered to the base station. Operation 812 may be performed by a registration component, such as registration component 306, in accordance with one or more implementations.

After registration of a first end unit to the base station, a second end unit may be registered to the base station using the same or similar method to method 800. The second end unit may use a codec different from the codec used by the first end unit. For example, the first end unit may use the first codec to encode and/or decode digital audio signals. The second end unit may use a second codec, different from the first codec, to encode and/or decode digital audio signals. After registration of the end units at the operation 812, the base station may be configured to receive from, and transmit to, the first end unit audio signals encoded by the first codec, and the base station may be configured to receive from, and transmit to, the second end unit audio signals encoded by the second codec. It is to be understood that the disclosure of a first and second set of access information in this description is not intended to be limiting. The communication system herein contemplated is capable of using any number of sets of access information as well as codecs.

Figure 8:
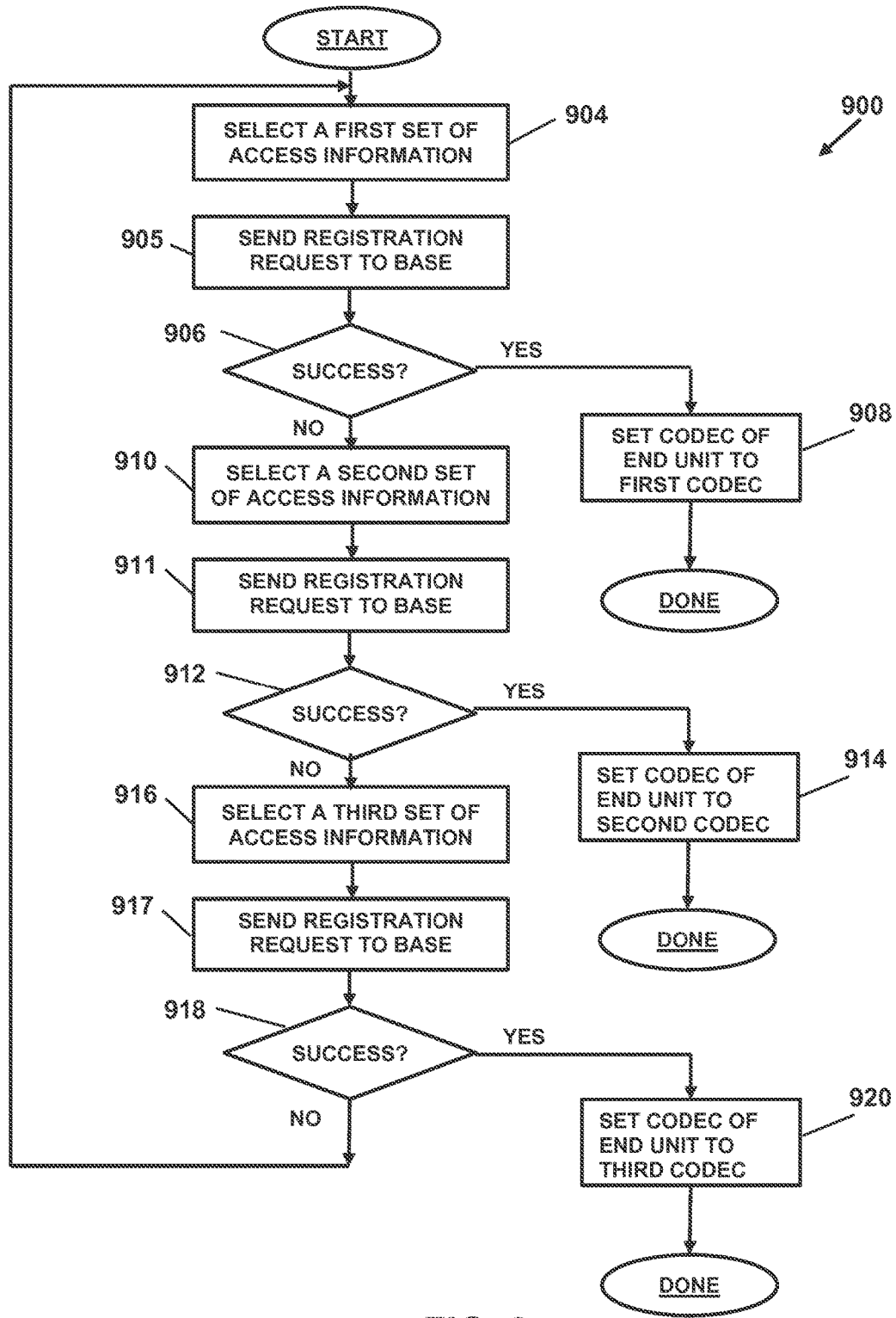

FIG. 8 illustrates a method 900 of registering an end unit to a base station, in accordance with one or more implementations. The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 8 and described below is not intended to be limiting.

In some embodiments, method 900 in FIG. 8 illustrates a method of registering an end unit to a base station, in accordance with one or more implementations. Method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 904, a first set of access information may be selected by the end unit to provide with the registration request. In some implementations, at an operation 904, selection and/or entry of a desired set of access information to provide with the registration request may be facilitated. Selection and/or entry of the desired set of access information may be done by a user and/or operator of the communication system. The first set of access information may facilitate a determination, by the base station, that the communication system end unit is configured to use a first codec(s) to encode and/or decode digital audio signals. The operations performed at operation 904 may be performed by an access selector, such as access selector 508, in accordance with one or more implementations.

At an operation 905, in response to selecting a first set of access information, the end unit may send a registration request to the base using the first set of access information. The operations performed at operation 905 may be performed by a registration component, such as registration component 510, in accordance with one or more implementations.

At an operation 906, the end unit may determine whether registration with the base station was successful. The operations performed at operation 906 may be performed by a verification component, such as verification component 512, in accordance with one or more implementations.

At an operation 908, in response to a successful registration of the end unit to the base station using the first set of access information, the end unit may be configured to set the first codec as the codec to use for encoding and/or decoding digital audio signals sent between the end unit and the base station. The operations performed at operation 908 may be performed by a registration component, such as registration component 510, in accordance with one or more implementations.

At an operation 910, in response to an unsuccessful registration of the end unit to the base station using the first set of access information, a second set of access information may be selected by the end unit to provide with the registration request. The second set of access information may facilitate a determination, by the base station, that the communication system end unit is configured to use a second codec(s) to encode and/or decode digital audio signals. The operations performed at operation 910 may be performed by an access selector, such as access selector 508, in accordance with one or more implementations. The access selector 508 may perform its functions automatically and/or may facilitate manual selection and/or entry of a desired set of access information to use by a user and/or operator of the communication system component.

At an operation 911, in response to selecting a second set of access information, the end unit may send a registration request to the base using the second set of access information. The operations performed at operation 911 may be performed by a registration component, such as registration component 510, in accordance with one or more implementations.

At an operation 912, the end unit may determine whether registration with the base station was successful. The operations performed at operation 912 may be performed by a verification component, such as verification component 512, in accordance with one or more implementations.

At an operation 914, in response to a successful registration of the end unit to the base station using the second set of access information, the end unit may be configured to set the second codec as the codec to use for encoding and/or decoding digital audio signals sent between the end unit and the base station. The operations performed at operation 914 may be performed by a registration component, such as registration component 510, in accordance with one or more implementations.

At an operation 916, in response to an unsuccessful registration of the end unit to the base station using the first set of access information and the second set of access information, a third set of access information may be selected by the end unit to provide with the registration request. In some implementations, selection and/or entry of a desired set of access information to provide with the registration request may be facilitated. Selection and/or entry of the desired set of access information may be done by a user and/or operator of the communication system. The third set of access information may facilitate a determination, by the base station, that the communication system end unit is configured to use a third codec(s) to encode and/or decode digital audio signals. The operations performed at operation 916 may be performed by an access selector, such as access selector 508, in accordance with one or more implementations.

At an operation 917, in response to selecting a third set of access information, the end unit may send a registration request to the base using the third set of access information. The operations performed at operation 917 may be performed by a registration component, such as registration component 510, in accordance with one or more implementations.

At an operation 918, the end unit may determine whether registration with the base station was successful. The operations performed at operation 918 may be performed by a verification component, such as verification component 512, in accordance with one or more implementations.

At an operation 920, in response to a successful registration of the end unit to the base station using the third set of access information, the end unit may be configured to set the third codec as the codec to use for encoding and/or decoding digital audio signals sent between the end unit and the base station. The operations performed at operation 920 may be performed by a registration component, such as registration component 510, in accordance with one or more implementations.

In response to a failed registration attempt at the operation 918, the end unit may be configured to provide an indication that the end unit cannot register with the base station. In response to the failed registration attempt at the operation 918, the end unit may be configured to repeat the operations of method 900.

The codec(s) herein disclosed may refer to a single codec and/or multiple individual codecs. The systems herein described may be capable of encoding and/or decoding digital audio speech using one or more codecs.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A base station for use in a communication system, the base station comprising:
   electronic storage configured to store codecs used to encode and/or decode digital audio signals; and
   one or more processors configured by machine-readable instructions to:
      encode and/or decode digital audio signals using the codecs stored on the electronic storage of the base station;
      receive a first registration request from a first communication system end unit, wherein the first registration request includes a first set of access information, wherein the first communication system end unit is configured to encode and/or decode digital audio signals using one or more primary codecs, wherein the first set of access information provided by the first communication system end unit facilitates identification by the base station of the one or more primary codecs used by the first communication system end unit to encode and/or decode digital audio signals;
      determine whether the first set of access information provided by the first communication system end unit is acceptable to the base station;
      identify the one or more primary codecs used by the first communication system end unit to encode and/or decode digital audio signals; and
      record an indication of the one or more primary codecs used by the first communication system end unit to encode and/or decode digital audio signals, in response to the determination that the first set of access information is acceptable to the base station;
      wherein recording the indication of the one or more primary codecs used by the first communication system end unit facilitates communication between the first communication system end unit and the base station using the one or more primary codecs.

2. The base station of claim 1, wherein the codecs stored on the base station comprise at least a first codec configured to support wideband audio signals and a second codec configured to support narrowband audio signals.

3. The base station of claim 1, wherein the one or more processors are further configured to:
   receive a second registration request from a second communication system end unit, wherein the second communication system end unit is different from the first communication system end unit, wherein the second registration request includes a second set of access information, wherein the second communication system end unit is configured to encode and/or decode digital audio signals using one or more secondary codecs, wherein the second set of access information provided by the second communication system end unit facilitates identification by the base station of the one or more secondary codecs used by the second communication system end unit to encode and/or decode digital audio signals;
   determine whether the second set of access information provided by the second communication system end unit is acceptable to the base station;
   identify the one or more secondary codecs used by the second communication system end unit to encode and/or decode digital audio signals; and
   record a second indication of the one or more secondary codecs used by the second communication system end unit to encode and/or decode digital audio signals, in response to the determination that the second set of access information is acceptable to the base station;
   wherein recording the second indication of the one or more secondary codecs used by the second communication system end unit facilitates communication between the second communication system end unit and the base station using the one or more secondary codecs.

4. The base station of claim 3, wherein the one or more primary codecs used by the first communication system end unit include a first codec configured to support wideband audio signals, and wherein the one or more secondary codecs used by the second communication system end unit include a second codec configured to support narrowband audio signals.

5. The base station of claim 1, wherein the first set of access information facilitates a determination of capabilities of the first communication system end unit, and wherein the one or more processors are further configured to identify the capabilities of the first communication system end unit based on the first set of access information.

6. The base station of claim 3, further comprising:
   a transceiver configured to receive digital audio signals originating from the first communication system end unit and transmit audio signals to the second communication system end unit; and
   wherein the audio processor is configured to:
      decode the digital audio signals using the one or more primary codecs used by the first communication system end unit in response to receiving the digital audio signals from the first communication system end unit; and encode the digital audio signals using the one or more secondary codecs used by the second communication system end unit for transmission to the second communication system end unit.

7. An end unit for use in a communication system, the end unit comprising:
electronic storage configured to store codecs used to encode and/or decode digital audio signals; and
one or more processors configured by machine-readable instructions to:
encode and/or decode digital audio signals using the codecs stored on the electronic storage of the end unit, wherein individual ones of the codecs are associated with individual sets of access information;
facilitate communication with a communication system base station, wherein the base station comprises a base station audio processor configured to encode and/or decode audio signals using one or more codecs;
select a first set of access information, wherein the first set of access information facilitates a determination, by the base station, of compatibility of the end unit with the base station, wherein the first set of access information is associated with a first codec, and wherein the first set of access information facilitates a determination, by the base station, of the first codec used by the end unit;
provide a registration request to the base station, wherein the registration request includes the first set of access information;
determine whether the base station accepted the registration request from the end unit;
in response to determining that the base station accepted the registration request from the end unit, record an indication to use the first codec when communicating with the base station; and
in response to determining that the base station rejected the registration request from the end unit, select a second set of access information that is different from the first set of access information, and provide a second registration request to the base station, wherein the second registration request includes the second set of access information.

8. The end unit of claim 7, wherein the end unit is configured to transmit and receive digital audio signals from one or more other end units, wherein the audio signals are encoded using the first codec.

9. The end unit of claim 7, wherein the end unit further comprises:
a speaker, wherein the end unit is configured to convert the decoded digital audio signals to analogue audio signals and send the analogue audio signals to the speaker.

10. The end unit of claim 7, wherein the end unit further comprises:
a microphone configured to receive audio signals, wherein the end unit is configured to digitize the audio signals from the microphone, encode the digital audio signals using the first codec, and transmit the encoded digital audio signals to the base station.

11. A method of registering one or more communication system end units to a base station, comprising:
receiving a first registration request from a first communication system end unit, wherein the first registration request includes a first set of access information, wherein the first communication system end unit is configured to encode and/or decode digital audio signals using one or more primary codecs, wherein the first set of access information provided by the first communication system end unit facilitates identification by the base station of the one or more primary codecs used by the first communication system end unit to encode and/or decode digital audio signals;
determining whether the first set of access information provided by the first communication system end unit is acceptable to the base station;
identifying the one or more primary codecs used by the first communication system end unit to encode and/or decode digital audio signals; and
recording an indication of the one or more primary codecs used by the first communication system end unit to encode and/or decode digital audio signals, in response to the determination that the first set of access information is acceptable to the base station;
wherein recording the indication of the one or more primary codecs used by the first communication system end unit facilitates communication between the first communication system end unit and the base station using the one or more primary codecs.

12. The method of claim 11, wherein codecs stored on the base station comprise at least a first codec that supports wideband audio signals and a second codec that supports narrowband audio signals.

13. The method of claim 11, further comprising:
receiving a second registration request from a second communication system end unit that is different from the first communication system end unit, wherein the second registration request includes a second set of access information, wherein the second communication system end unit is configured to encode and/or decode digital audio signals using one or more secondary codecs, wherein the second set of access information provided by the second communication system end unit facilitates identification by the base station of the one or more secondary codecs used by the second communication system end unit to encode and/or decode digital audio signals;
determining whether the second set of access information provided by the second communication system end unit is acceptable to the base station;
identifying the one or more secondary codecs used by the second communication system end unit to encode and/or decode digital audio signals; and
recording a second indication of the one or more secondary codecs used by the second communication system end unit to encode and/or decode digital audio signals, in response to the determination that the second set of access information is acceptable to the base station;
wherein recording the second indication of the one or more secondary codecs used by the second communication system end unit facilitates communication between the second communication system end unit and the base station using the one or more secondary codecs.

14. The method of claim 13, wherein the one or more primary codecs used by the first communication system end unit include a first codec that supports wideband audio signals, and wherein the one or more secondary codecs used by the second communication system end unit include a second codec that supports narrowband audio signals.

15. The method of claim 11, wherein the first set of access information facilitates a determination of capabilities of the first communication system end unit, further comprising identifying the capabilities of the first communication system end unit based on the first set of access information.

16. The method of claim 13, further comprising:
receiving digital audio signals originating from the first communication system end unit;
decoding the digital audio signals using the one or more primary codecs used by the first communication system end unit in response to receiving the digital audio signals from the first communication system end unit
encoding the digital audio signals using the one or more secondary codecs used by the second communication system end unit for transmission to the second communication system end unit; and
transmitting the digital audio signals to the second communication system end unit.

* * * * *